United States Patent
Brady et al.

(10) Patent No.: US 8,290,744 B2
(45) Date of Patent: Oct. 16, 2012

(54) INTEGRATED RATE ISOLATION SENSOR

(75) Inventors: Tye Brady, Southborough, MA (US);
Timothy Henderson, Ashland, MA (US); Richard Phillips, Sudbury, MA (US); Doug Zimpfer, Houston, TX (US); Tim Crain, Taylor Lake Village, TX (US)

(73) Assignees: The Charles Stark Draper Laboratory, Inc., Cambridge, MA (US); The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 339 days.

(21) Appl. No.: 12/687,526

(22) Filed: Jan. 14, 2010

(65) Prior Publication Data

US 2011/0172950 A1    Jul. 14, 2011

Related U.S. Application Data

(60) Provisional application No. 61/144,712, filed on Jan. 14, 2009.

(51) Int. Cl.
*G06F 11/30* (2006.01)
(52) U.S. Cl. ..................................... 702/183
(58) Field of Classification Search ............. 702/183
See application file for complete search history.

(56) References Cited

U.S. PATENT DOCUMENTS

| | | | | |
|---|---|---|---|---|
| 3,489,004 A | * | 1/1970 | Barnhill et al. | 73/178 R |
| 3,680,355 A | * | 8/1972 | Goldstein et al. | 73/1.77 |
| 5,184,304 A | * | 2/1993 | Huddle | 701/510 |
| 5,631,656 A | * | 5/1997 | Hartman et al. | 342/357.32 |
| 5,719,764 A | * | 2/1998 | McClary | 700/79 |
| 6,278,945 B1 | | 8/2001 | Lin | |
| 6,856,905 B2 | | 2/2005 | Pasturel et al. | |
| 6,859,751 B2 | | 2/2005 | Cardarelli | |
| 6,944,541 B2 | | 9/2005 | Pasturel et al. | |
| 7,386,395 B1 | | 6/2008 | Masson | |
| 7,406,867 B2 | | 8/2008 | Cardarelli | |
| 7,421,343 B2 | | 9/2008 | Hawkinson | |
| 7,481,109 B2 | | 1/2009 | Moore et al. | |
| 2003/0135327 A1 | | 7/2003 | Levine et al. | |
| 2004/0064252 A1 | | 4/2004 | Kirkland et al. | |
| 2005/0114023 A1 | | 5/2005 | Williamson et al. | |
| 2006/0106511 A1 | | 5/2006 | Milelli et al. | |
| 2006/0253253 A1 | | 11/2006 | Reynolds et al. | |
| 2007/0245826 A1 | | 10/2007 | Cardarelli | |
| 2008/0091350 A1 | | 4/2008 | Smith et al. | |
| 2008/0262729 A1 | | 10/2008 | Bacon et al. | |
| 2008/0270027 A1 | | 10/2008 | Stecko et al. | |
| 2011/0257927 A1 | * | 10/2011 | Bharadwaj et al. | 702/150 |

* cited by examiner

*Primary Examiner* — Cindy H Khuu
(74) *Attorney, Agent, or Firm* — Goodwin Procter LLP

(57) ABSTRACT

In one embodiment, a system for providing fault-tolerant inertial measurement data includes a sensor for measuring an inertial parameter and a processor. The sensor has less accuracy than a typical inertial measurement unit (IMU). The processor detects whether a difference exists between a first data stream received from a first inertial measurement unit and a second data stream received from a second inertial measurement unit. Upon detecting a difference, the processor determines whether at least one of the first or second inertial measurement units has failed by comparing each of the first and second data streams to the inertial parameter.

26 Claims, 2 Drawing Sheets

INTEGRATED RATE ISOLATION SENSOR

CROSS-REFERENCE TO RELATED APPLICATION

This application claims priority to and the benefit of U.S. Provisional Patent Application No. 61/144,712, filed on Jan. 14, 2009, which is hereby incorporated herein by reference in its entirety.

STATEMENT REGARDING FEDERALLY SPONSORED RESEARCH OR DEVELOPMENT

This invention was made with Government support under Contract No. NNJ06HC37C awarded by the National Aeronautics and Space Administration (NASA). The Government has certain rights in this invention.

TECHNICAL FIELD

Embodiments of the invention generally relate to inertial measurement systems and, in particular, to fault-tolerant inertial measurement systems.

BACKGROUND

An inertial measurement unit ("IMU") is an electronic device that, using at least one accelerometer or gyroscope, measures and reports such parameters as velocity, orientation, and/or gravitational force. Some vehicles, such as ones that operate outside the range of a global-positioning system ("GPS"), use an on-board IMU to measure these parameters and determine, for example, the vehicle's speed, acceleration, orientation, position, and/or direction of movement. Vehicles used for high-availability or life-critical systems may employ a fault-tolerant IMU system, for example one that uses multiple IMUs to protect against the failure of a single IMU. Typically, fault-tolerant IMU systems use three or more IMUs to detect the failure of an IMU and isolate the failing IMU from the other, functional IMUs. For example, two or more similar IMUs having similar outputs will vote out a third failed IMU having a dissimilar output.

A fault-tolerant system having multiple IMUs, however, generally pays an associated mass, power, and volume ("M/P/V") penalty for each additional IMU. Some vehicles, such as satellites or spacecraft, value M/P/V very highly, and the M/P/V of three IMUs may present a prohibitively high barrier to cost-effective launch and operation of the vehicle. Furthermore, the cost of each IMU itself may render a traditional fault-tolerant IMU system financially untenable. A need therefore exists for a fault-tolerant IMU design with less mass, power consumption, volume, and/or cost.

SUMMARY

In general, various aspects of the systems and methods described herein include a fault-tolerant IMU system that requires only two IMUs, thereby providing a savings in mass, power consumption, volume, and/or cost over traditional fault-tolerant IMU systems. In one embodiment, a processor monitors the data streams output from the two IMUs for differences therebetween (i.e., failure detection, also known as fault detection). Once a difference has been detected, the processor compares the two data streams to the data from a less-accurate, non-IMU sensor (having, for example, less mass, power consumption, volume, and/or cost than either IMU) to determine which IMU has failed (i.e., failure isolation, also known as fault isolation or identification). The system then implements a corrective action to accommodate the identified fault (i.e., fault recovery).

In general, in one aspect, embodiments of the invention feature a system for providing fault-tolerant inertial measurement data. The system includes a sensor and a processor. The sensor, which has less accuracy than an inertial measurement unit, measures an inertial parameter. The processor detects whether a difference exists between a first data stream received from a first inertial measurement unit and a second data stream received from a second inertial measurement unit. Upon detecting a difference, the processor determines whether the first and/or second inertial measurement unit has failed by comparing each of the first and second data streams to the inertial parameter.

The sensor may include a gyroscope and/or an accelerometer, a MEMS device, and/or an x-axis gyroscope, a y-axis gyroscope, and a z-axis gyroscope. Compared to either the first or second inertial measurement units, the sensor may consume less power, area, and/or volume. The sensor may have an order of magnitude less accuracy than the first and second inertial measurement units.

The first and second data streams may represent measurements of the same parameter. An output may indicate whether a failure has been determined, and a display may display a status of the sensor, the first, and/or the second inertial measurement units. The processor may further combine at least two of the inertial parameter, the first data stream, and the second data stream to provide an inertial measurement data output.

In general, in another aspect, embodiments of the invention feature a processor for providing fault-tolerant inertial measurement data. The processor includes at least one input for receiving first and second data streams from first and second inertial measurement unit, respectively. Circuitry detects whether a difference exists between the first and second data streams. Upon detecting a difference, the circuitry determines whether at least one of the first or second inertial measurement units has failed by comparing each of the first and second data streams to the output of a sensor having less accuracy than the first and second inertial measurement units. An output provides inertial measurement data based on the determination.

The sensor may have an order of magnitude less accuracy than the first and second inertial measurement units. The inertial measurement data may include a combination of at least two of the first data stream, the second data stream, and the output of the sensor, or may consist essentially of the output of the sensor. An error output may indicate the determination of a failure.

In general, in another aspect, embodiments of the invention feature a fault-tolerant system for determining a position of a vehicle. The system includes a first inertial measurement unit for providing a first rate stream and a second inertial measurement unit for providing a second rate stream. A sensor, having less accuracy than the first and second inertial measurement units, measures an inertial parameter, and a processor detects whether a difference exists between the first and second rate streams. Upon detecting a difference, the processor determines whether the first and/or second inertial measurement units has failed by comparing each of the first and second rate streams to the inertial parameter.

The vehicle may be a spacecraft, a satellite, an aircraft, a boat, and/or a ground-based vehicle. The processor may disable a failed inertial measurement unit. A display may display a status of the sensor, the first inertial measurement unit, and/or the second inertial measurement unit.

In general, in another aspect, embodiments of the invention feature a method for providing fault-tolerant inertial measurement data. A processor receives a first data stream from a first inertial measurement unit and a second data stream from a second inertial measurement unit. If one exists, a difference between the first and second data streams exists is detected. Upon detecting a difference, if the first and/or second inertial measurement units have failed, the failure is determined by comparing each of the first and second data streams to an output of a sensor having less accuracy than the first and second inertial measurement units. A corrective action is implemented upon determining that an inertial measurement unit has failed.

The corrective action may include disabling the failed inertial measurement unit and/or outputting an error signal. Sensor-level identification and/or box-level identification may be performed to determine whether at least one of the first or second inertial measurement units has failed. The detected difference may be compared to a threshold, and the threshold may be user-defined. The sensor, in comparison to either the first inertial measurement unit or the second inertial measurement unit, may consume less than power, area, and/or volume.

These and other objects, along with advantages and features of the embodiments of the present invention herein disclosed, will become more apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. In the following description, various embodiments of the present invention are described with reference to the following drawings, in which.

DETAILED DESCRIPTION

Embodiments of the present invention include an integrated-rate isolation sensor ("IRIS") system that allows for fault detection and isolation using only two IMUs instead of the traditional three or more. Reducing the number of IMUs reduces the total M/P/V and cost of the system, making it particularly valuable for use in vehicles such as spacecraft and satellite, as well as in aircrafts, boats, and ground-based vehicles.

Figure 1:
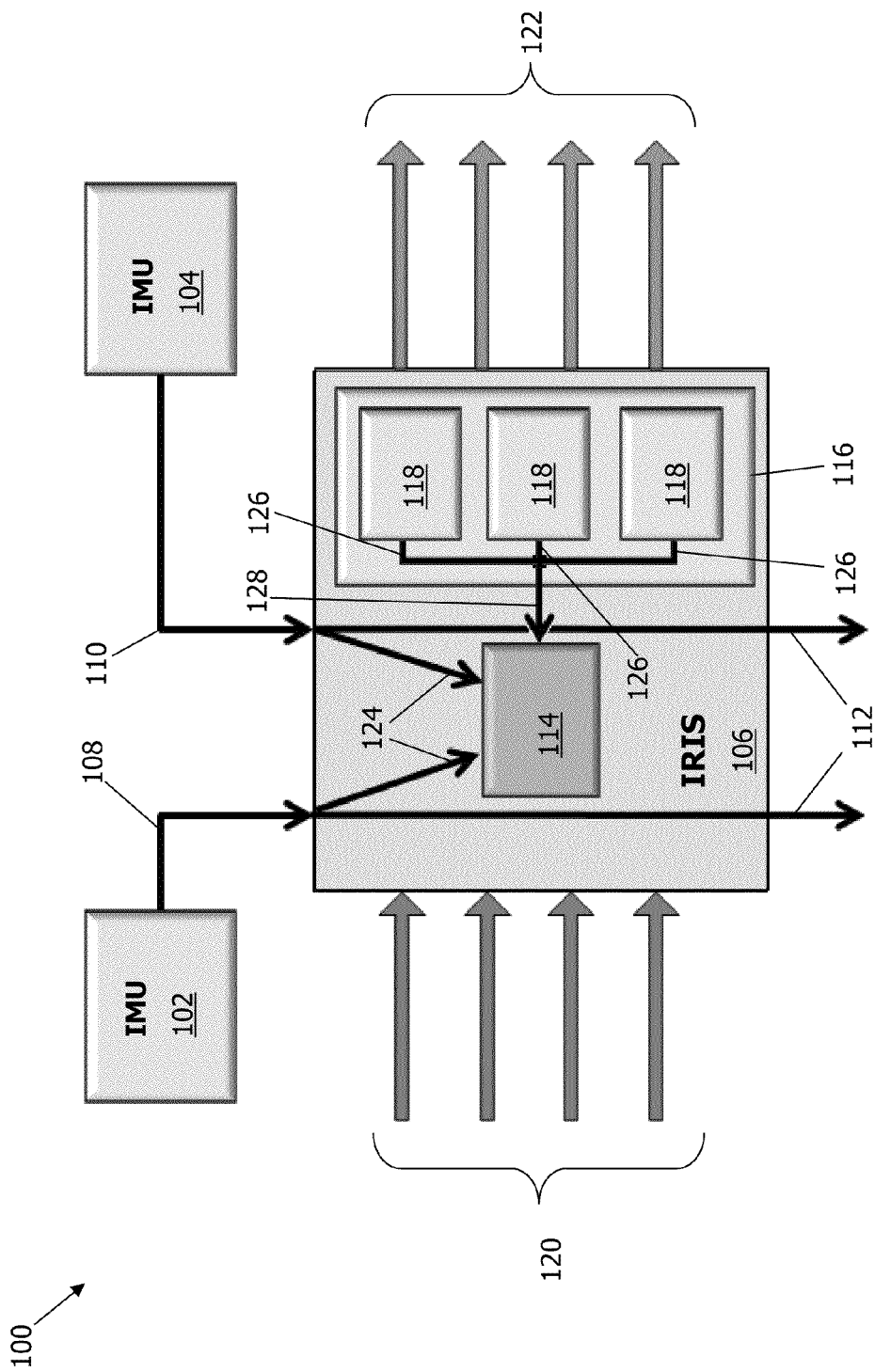
FIG. 1 is a block diagram illustrating a fault-tolerant IMU system in accordance with one embodiment of the invention.

FIG. 1 illustrates one embodiment of a fault-tolerant IMU system 100. The system includes two IMUs 102, 104 and the IRIS system 106. The IMUs 102, 104 may be high-performance and/or navigation-grade units, which, as a consequence, may have high mass, power consumption, volume, and/or cost. The IMUs 102, 104 may include, for example, mechanical or fiber-optic gyroscopes and/or accelerometers. The IMUs 102, 104 each output a stream of information—a first data stream 108 corresponding to the first IMU 102 and a second data stream 110 corresponding to the second IMU 104. Each data stream 108, 110 may include, for example, rate data in the form of X, Y, Z position data, orientation data, or any other IMU data. The rate streams 108, 110 may be transmitted to, for example, the electronics of a vehicle via output ports 112. In one embodiment, as illustrated, the IRIS system 106 passively taps into the IMU rate streams 108, 110 to receive them at inputs 124 of a processor 114. The processor 114 may be a general purpose microprocessor (e.g., any of the PENTIUM microprocessors supplied by Intel Corporation) or an application-specific microprocessor programmed using any suitable programming language or languages (e.g., C, C++, C#, Java, Visual Basic, LISP, BASIC, PERL, assembly, etc.).

In addition to the processor 114, the IRIS system 106 may include a sensor system 116 for providing an independent rate measurement to the processor 114. The sensor system 116 may include one or more sensors 118 for measuring different parameters, and associated electronics for operating the sensors 118. For example, the sensors 118 may be gyroscopes or accelerometers. Three sensors 118 (a sensor triad) may provide X, Y, Z rate data. In one embodiment, the sensors 118 are micro-electro-mechanical-system ("MEMS") gyroscopic sensors or MEMS accelerometers. The outputs of the sensors 118 may be sent to the processor 114 as sensor-level outputs 126, wherein the processor 114 receives, for example, orthogonal X, Y, or Z data from each sensor 118. Alternatively, the outputs of the sensors 118 may be combined and sent to the processor 114 as a box-level output 128, wherein the X, Y, Z data from each sensor 118 is combined into a single X, Y, Z vector prior to being sent to the processor 114. The IMUs 102, 104 may be similarly configured to send either sensor-level or box-level outputs to the processor 114.

The processor 114 may be disposed in the same chip or housing as the sensor system 116. Alternatively, the processor 114 may be located remotely from and communicate wirelessly with the sensor system 116 and/or IMUs 102, 104. As will be understood by one of ordinary skill in the art, the configuration shown in FIG. 1 is non-limiting; other configurations are possible.

In one embodiment, the accuracy of the sensor system 116 is less than that of a typical, navigation-grade IMU such as the IMUs 102, 104. As mentioned above, this reduction in accuracy allows the sensory system 116 to have less mass, volume, power consumption, surface area, and/or cost than a navigation-grade IMU. In one embodiment, the sensor system 116 has an order of magnitude less accuracy than a navigation-grade IMU. As one illustrative example, the IMUs 102, 104 may be rated to have an angular-random walk ("ARW") noise figure of $0.0035°/\sqrt{hr}$, a bias instability factor of $0.030°/hr$, and a time constant of 100 sec. In this example, the sensors 118 may be MEMS tuning fork gyroscopes having a 50-micron thick comb. These gyroscopes have an ARW noise figure of $0.010°/\sqrt{hr}$, a bias instability factor of $0.060°/hr$, and a time constant of 900 sec.

The IRIS system 106 may also include inputs 120 for receiving user input. The inputs 120, which are explained further below, may allow a user to enter a desired failure threshold, a desired decision time, a desired confidence level, and/or configuration information. Likewise, the IRIS system 106 may provide outputs 122 that provide, as also explained further below, such information as IMU 102, 104 good/bad indicators, IMU statistics, and/or an IMU combination rate. While, in one embodiment, the IRIS system 106 requires no additional software or hardware, the fault-tolerant IMU system 100 may also include, in other embodiments, a means for allowing a user to input data via the inputs 120 (e.g., a keypad, keyboard, touchscreen, or network input port) and a display for displaying, in real time, the results represented by the outputs 122.

Figure 2:
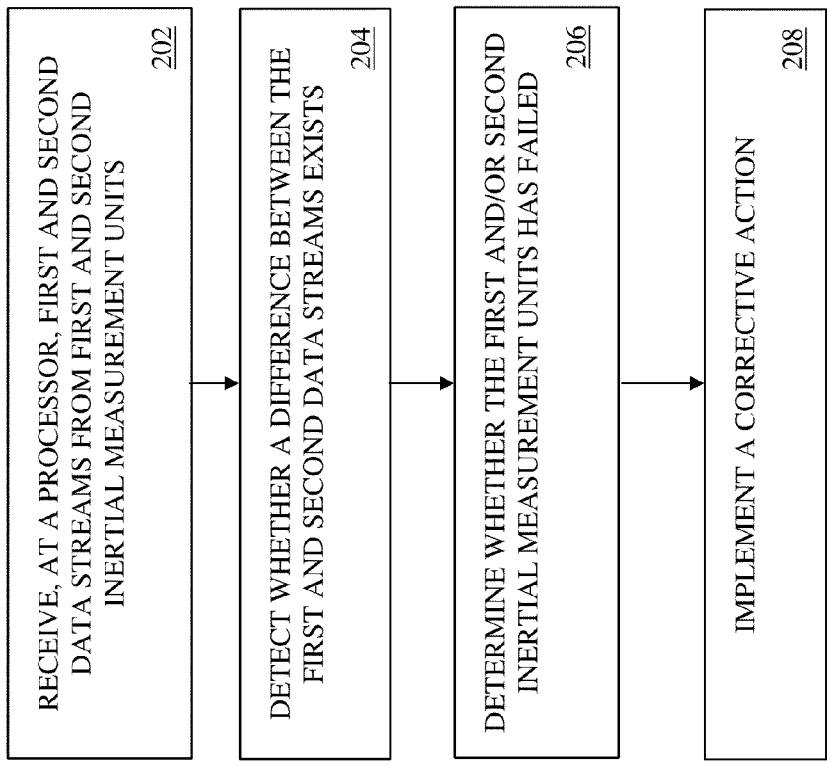
FIG. 2 is a flowchart illustrating a method for providing fault-tolerant inertial measurement data in accordance with one embodiment of the invention.

FIG. 2 is a flowchart illustrating one embodiment of a method 200 for providing fault-tolerant inertial measurement data. In summary, a first data stream from a first IMU and a second data stream from a second IMU are received at a processor (Step 202). If a difference between the first and second data streams exists, it is detected (Step 204). Upon detecting a difference, each of the first and second data streams is compared to an output of a sensor (which has less accuracy than the first and second inertial measurement units), thereby allowing a determination of whether at least one of the first or second inertial measurement units has failed (Step 206). Upon determining that an inertial measurement unit has failed, a corrective action is implemented (Step 208).

In greater detail, and with reference to both FIGS. 1 and 2, the data streams 108, 110 are received at the processor 114 in Step 202. The processor 114 may passively tap into the rate streams 108, 110 via inputs 124, allowing the rate streams to proceed to the output ports 112 for use downstream. Alternatively, in another embodiment, the rate streams 108, 110 are not used elsewhere and terminate at the processor 114. The rate streams 108, 110 may be transmitted as serial or parallel analog or digital data, and the processor 114 may include analog-to-digital converters, buffers, registers, or network receivers at the input ports 124 to receive the data. The processor 114 may analyze all of the incoming rate data 108, 110 or sample a portion of it. In one embodiment, the processor 114 sends a control signal to the IMUs 102, 104 to modify the type or rate of incoming data 108, 110. The processor 114 may compare the two IMU rate streams 108, 110 continuously or at periodic or varying intervals.

The processor 114 detects whether or not a difference exists between the data streams 108, 110 in Step 204. In one embodiment, the data streams 108, 110 are monitored until they differ by more than a predetermined or a user-defined failure threshold (input via, for example, the inputs 120). The predetermined failure threshold may be programmed into the processor 114 at the time of its manufacture and/or may be customized to suit the particular application of the fault-tolerant system 100. For example, if less-accurate IMUs 102, 104 are to be used, the failure threshold may be set higher to account for any errors in accuracy. Likewise, if the IMUs 102, 104 are of dissimilar manufacture, age, or quality, the failure threshold may be similarly raised. If, on the other hand, an application demands precision IMU data, the failure threshold may be set at a lower value, thereby triggering a difference determination when a smaller amount of variance exists between the data streams 108, 110. A user may desire to change the failure threshold upon deploying the fault-tolerant system 100 in a new environment, to tune the amount of failures detected, in response to a change in system parameters, or for any other reason.

Other parameters may also play a role in the difference determination and may also be predetermined or set by a user. For example, a decision-time parameter may determine how long the difference between the data streams 108, 110 must be over the failure threshold before a difference is flagged. Setting a long decision time may, for example, filter out sporadic or spiky differences, while setting a short one may increase the precision of the IMU data. A confidence-level parameter may adjust the desired certainty that a determined difference corresponds to an actual difference in the data streams 108, 110, and may also be predetermined or user-set. For example, a specified confidence level of 95% may require a determination that a detected difference is caused by a real failure (instead of, e.g., noise) with 95% certainty.

Referring to Step 206, the method 200 isolates (e.g., identifies and/or locates) the failure determined in Step 204. Note that the terms fault isolation and fault identification may be used interchangeably to indicate the isolation, identification, and/or location of a failure. If one of the IMUs 102, 104 fails completely and stops sending data 108, 110, identification of the failing IMU 102, 104 is trivial. A more difficult case occurs when one of the IMUs 102, 104 fails only partially and begins sending bad data 108, 110. In this case, although a difference is detected between the IMUs 102, 104, it may not be obvious which IMU 102, 104 is functioning properly and which IMU 102, 104 has failed. In general, the rate streams 108, 110 are compared to the outputs 126, 128 of the sensors 118, and the rate stream 108, 110 least like the sensor output 126, 128 is deemed to belong to the failing IMU 102, 104.

More specifically, the outputs of the sensor system 116 and of the IMUs 102, 104 each include a true rate (i.e., a rate/orientation/force of the system 100 as reported by each device), noise (i.e., random, intermittent interference due to external, unrelated signals, other internal signals, or other sources) and/or a bias (i.e., a steady-state offset from a true rate due to, for example, miscalibration, drift, or temperature). One of skill in the art will realize that many methods exist for fault isolation given data from the IMUs 102, 104 and the sensor system 116, and the present invention is not limited to any particular method.

One illustrative example of a method of fault isolation follows. In general, the method computes a parity vector (described further below) that combines the accumulated measurements from the IMUs 102, 104 and, in one embodiment, the sensor system 116. The individual parity vectors from each IMU 102, 104 are then compared to the accumulated parity vector. After a certain amount of time has elapsed, a parity vector from a failing IMU 102, 104 differs enough from the accumulated parity vector to be identified and identified. The comparison may proceed until a desired confidence level is reached or until a desired decision time expires. Each of these parameters may be given by user input (via the inputs 120) or may be preset in the processor 114 to typical values.

More specifically, the illustrative method of fault isolation begins with measuring a fault vector at each time step as an angular bias accumulates. Each IMU 102, 104 is considered in turn, and the fault is assumed to be a bias in that IMU 102, 104. For each IMU 102, 104, a hypothetical fault vector associated with the bias in that IMU is also computed. In one embodiment, the difference between the measured fault and the hypothetical fault is minimized by adjusting the magnitude of the fault vector. In another embodiment, only the angle between the two vectors is used as the figure of merit. In either case, the figure of merit may be normalized by the noise in the measurement, e.g. for the first variation. The difference between the measured fault vector and the hypothetical fault vector is then computed, and the resultant vector is projected into parity (i.e., null) space. The chi-squared distributed noise ($\chi^2$) is computed in parity space, and a cumulative probability is computed for the computed value of $\chi^2$ and the appropriate number of degrees of freedom. The independent probability that the resultant vector is not simply due to noise, e.g., angular-random walk (ARW) noise, is defined as one minus this cumulative probability. Once each IMU 102, 104 has been considered in turn in accordance with the above steps, a joint probability is computed, given the assumption that one and only one IMU 102, 104 has failed (i.e. the probabilities that each sensor has failed must add to one). When this joint probability reaches a desired level, the faulty IMU 102, 104 is declared to have been identified.

Fault identification may be performed using either the box-level output 128 (i.e., box-level identification) or the sensor-level output 126 (i.e., sensor-level identification). Box-level identification uses the sum of the squares of the accumulated output of sensor-level triads in IMUs 102, 104 to perform failure identification. Note that, while each sensor-level 126 measurement consists of the true rate, noise, and a possible bias, each box-level measurement 128 also has a true value, noise, and a possible bias related to (i.e., the square of), but not identical to, the sensor-level measurement 126. The box-level measurement is not dependent on the relative geometrical orientations between the IMUs 102, 104 and the sensor system 116. Box-level identification uses the square of variables which are themselves chi-square distributed and thus involve numbers which are chi-to-the-fourth distributed and products of numbers which are chi-squared distributed for fault identification. Box-level isolation may perform better than sensor-level identification.

Sensor-level identification, in contrast, uses the accumulated output 126 of each sensor 118 separately (and accumulates similarly separate outputs in the IMUs 102, 104) to perform fault identification. Geometrical configurations may be varied between the sensor system 116 and the corresponding sensors in the IMUs 102, 104 to change identification performance. Sensor-level identification may require fewer components/instruments than box-level isolation. Using either sensor-level or box level isolation, a fault causing a large change in an IMU bias shift (greater than, for example, 50 sigma) may be detected and subsequently identified in less than approximately 10 seconds.

Once a failure has been identified, a corrective action is implemented (Step 208). The processor 114 may select the most likely failing IMU 102, 104 and assert a corresponding good/bad indicator output 122. This information, along with, for example, sampled statistical information, may then be used by the user to actively switch to the non-failing IMU channel, or, in an alternative embodiment, the IRIS system 106 automatically switches the fault-tolerant system 100 to the non-failing IMU channel (i.e., disables the failing IMU 102, 104).

The IRIS system 106 may also output IMU statistics, such as time of IMU operation, historical IMU data, and/or, in the event of a failure, the severity of the failure and the identity of the failing IMU 102, 104. Furthermore, the IRIS system 106 may output an IMU combination rate. The combination rate may be a mixture or average of two or more of the IMU 102, 104 and sensor system 116 rates, or, in the event of a failure, just the rate of the non-failing IMU 102, 104. In the event that both IMUs 102, 104 fail, the combination rate may be just the sensor system 116 rate. Furthermore, the rate stream 126, 128 from the sensor system 116 may serve as an independent verification of the correctness of the IMU rate streams 108, 110. In one embodiment, the IRIS system 106 continually outputs to the user in real time the state of measurement for each IMU 102, 104 (e.g., failed or non-failed).

The IRIS system 106 may also accept configuration information as an input 120 from a user. This configuration information, as described above, may include calibration information to isolate each X, Y, and Z component of the rate streams from the IMUs 102, 104. In one embodiment, the IRIS system 106 continually re-calibrates the sensor system 116 while the IMU rate streams 108, 110 are equal, to take advantage of the higher accuracy of the IMU rate streams. Once a fault is detected, however, the IRIS system 106 may cease any re-calibration.

Having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A system for providing fault-tolerant inertial measurement data, the system comprising:
    a sensor, having less accuracy than an inertial measurement unit, for measuring an inertial parameter; and
    a processor for (i) detecting whether a difference exists between a first data stream received from a first inertial measurement unit and a second data stream received from a second inertial measurement unit, and (ii) upon detecting a difference, determining whether at least one of the first or second inertial measurement units has failed by comparing each of the first and second data streams to the inertial parameter.

2. The system of claim 1, wherein the first and second data streams represent measurements of the same parameter.

3. The system of claim 1, wherein the sensor comprises at least one of a gyroscope or an accelerometer.

4. The system of claim 1, wherein the sensor comprises a MEMS device.

5. The system of claim 1, wherein the sensor comprises an x-axis gyroscope, a y-axis gyroscope, and a z-axis gyroscope.

6. The system of claim 1, wherein the sensor, in comparison to either the first inertial measurement unit or the second inertial measurement unit, consumes less than at least one of power, area, or volume.

7. The system of claim 1, wherein the sensor has an order of magnitude less accuracy than the first and second inertial measurement units.

8. The system of claim 1, further comprising an output for indicating whether a failure has been determined.

9. The system of claim 1, further comprising a display for displaying a status of at least one of the sensor, the first inertial measurement unit, or the second inertial measurement unit.

10. The system of claim 1, wherein the processor further combines at least two of the inertial parameter, the first data stream, and the second data stream to provide an inertial measurement data output.

11. A processor for providing fault-tolerant inertial measurement data, the processor comprising:
    at least one input for receiving first and second data streams from first and second inertial measurement unit, respectively;
    circuitry for (i) detecting whether a difference exists between the first and second data streams, and (ii) upon detecting a difference, determining whether at least one of the first or second inertial measurement units has failed by comparing each of the first and second data streams to the output of a sensor having less accuracy than the first and second inertial measurement units; and
    an output for providing inertial measurement data based on the determination.

12. The processor of claim 11, wherein the inertial measurement data comprises a combination of at least two of the first data stream, the second data stream, and the output of the sensor.

13. The processor of claim 11, wherein the inertial measurement data consists essentially of the output of the sensor.

14. The processor of claim 11, further comprising an error output for indicating the determination of a failure.

15. The processor of claim 11, wherein the sensor has an order of magnitude less accuracy than the first and second inertial measurement units.

16. A fault-tolerant system for determining a position of a vehicle, the system comprising:
- a first inertial measurement unit for providing a first rate stream;
- a second inertial measurement unit for providing a second rate stream;
- a sensor, having less accuracy than the first and second inertial measurement units, for measuring an inertial parameter; and
- a processor for (i) detecting whether a difference exists between the first and second rate streams, and (ii) upon detecting a difference, determining whether at least one of the first or second inertial measurement units has failed by comparing each of the first and second rate streams to the inertial parameter.

17. The fault-tolerant system of claim 16, wherein the vehicle is selected from the group consisting of a spacecraft, a satellite, an aircraft, a boat, and a ground-based vehicle.

18. The fault-tolerant system of claim 16, wherein the processor further disables a failed inertial measurement unit.

19. The fault-tolerant system of claim 16, further comprising a display for displaying a status of at least one of the sensor, the first inertial measurement unit, or the second inertial measurement unit.

20. A method for providing fault-tolerant inertial measurement data, the method comprising:
- receiving, at a processor, a first data stream from a first inertial measurement unit and a second data stream from a second inertial measurement unit;
- detecting whether a difference between the first and second data streams exists;
- upon detecting a difference, determining whether at least one of the first or second inertial measurement units has failed by comparing each of the first and second data streams to an output of a sensor having less accuracy than the first and second inertial measurement units; and
- implementing a corrective action upon determining that an inertial measurement unit has failed.

21. The method of claim 20, wherein the corrective action comprises disabling the failed inertial measurement unit.

22. The method of claim 20, wherein the corrective action comprises outputting an error signal.

23. The method of claim 20, wherein determining whether at least one of the first or second inertial measurement units has failed comprises performing at least one of sensor-level identification or box-level identification.

24. The method of claim 20, further comprising comparing the detected difference to a threshold.

25. The method of claim 24, wherein the threshold is user-defined.

26. The method of claim 20, wherein the sensor, in comparison to either the first inertial measurement unit or the second inertial measurement unit, consumes less than at least one of power, area, or volume.

* * * * *